(No Model.)
M. F. WILFONG.
ANNEALING BOX.
No. 467,474.　　　　　　　Patented Jan. 19, 1892.
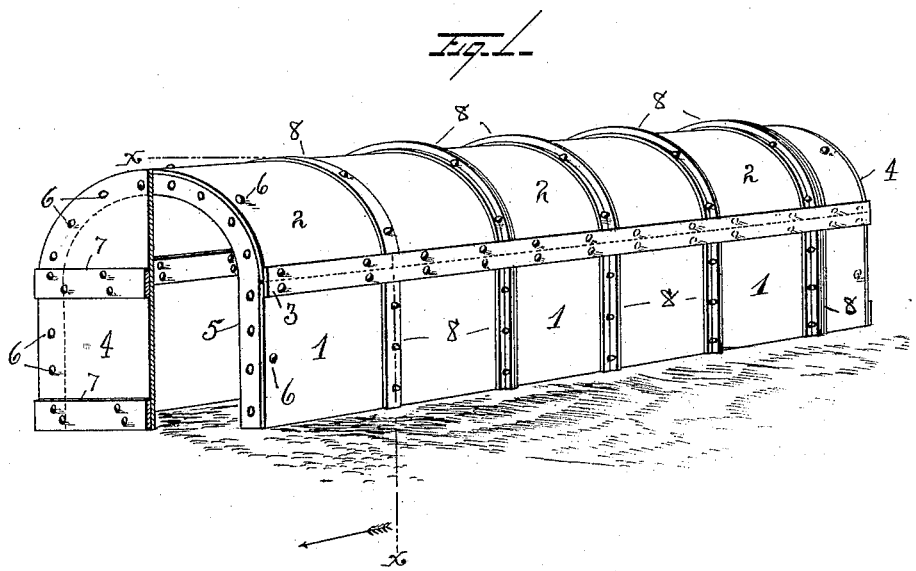
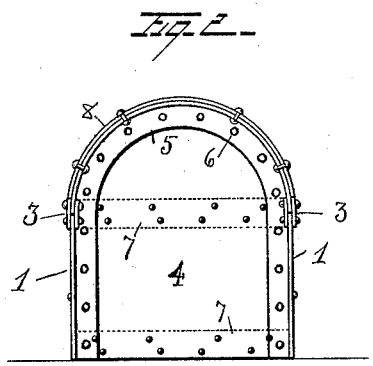
Witnesses:
F. Mitchell
John D Lane
Millard F. Wilfong
Inventor:
By his Attorney

UNITED STATES PATENT OFFICE.

MILLARD F. WILFONG, OF PHILADELPHIA, PENNSYLVANIA, ASSIGNOR OF ONE-HALF TO WILFONG BROTHERS, OF SAME PLACE.

ANNEALING-BOX.

SPECIFICATION forming part of Letters Patent No. 467,474, dated January 19, 1892.

Application filed September 15, 1891. Serial No. 405,803. (No model.)

*To all whom it may concern:*

Be it known that I, MILLARD F. WILFONG, a citizen of the United States, residing in the city and county of Philadelphia, State of Pennsylvania, have invented certain new and useful Improvements in Annealing-Boxes, of which the following is a specification, due reference being had to the accompanying drawings, forming part hereof.

Annealing-boxes as heretofore constructed have been subject to the objections of being liable to be warped or distorted by their own weight under the intense heat to which they are exposed when in use and generally have many joints or seams. The main object of this invention is to provide a box which will not warp, shall have few joints or seams, and which shall be so constructed that the contents of the box shall be protected from the action of oxygen during the process of annealing.

I will now describe a box constructed in accordance with my invention, and point out the novel features in the claims.

In the drawings, Figure 1 represents a perspective view of an annealing-box constructed in accordance with my invention, provided with various good forms of strengthening bars or bands, an end head being cut away to show a preferred manner of uniting the several sections; and Fig. 2 is a vertical sectional view of the same, taken on the line $x\ x$, Fig. 1, and looking in the direction indicated by the arrow.

Referring to the drawings, in which the parts are indicated by numerals, similar numerals denoting corresponding parts, 1 1 are the vertical side walls of the box, of a desired size and thickness, and 2 the arched top thereof. This top 2 I preferably construct of a single sheet of iron or other suitable material bent, shaped, or formed to an arc of a circle as to its longitudinal axis and of a length correspondent to the side walls of the box. These several sections are preferably butted together, as shown at 3, or may be otherwise united to provide an air-tight joint.

The bottom of the box is left open; but its respective ends are closed by flat plates or heads 4, adapted to be fitted thereto, and are united to the sides and the top of the box, preferably on the interior thereof, by angle-irons 5, bent or shaped to conform to the arch of the box, and rivets 6 in a manner to make an air-tight joint and hold the parts against displacement. A sufficient number of knee-joints could be employed with good result. To further stiffen the heads 4, I preferably rivet thereto strips of iron or the like 7, which extend across the heads, and I preferably use two such strips placed on the exterior side of the heads and spaced one at the extreme bottom thereof and the other at or above a point midway its height. To further stiffen the top and side walls, I preferably provide them with a desired number of spaced flat L, T, or other suitably-shaped bars or irons 8, which extend across the top 2 and vertically with the side walls and are riveted thereto in the manner shown.

An annealing-box thus constructed will last for a long time without being materially warped or misshaped by the heat, which is a matter of great importance, not only on account of their costliness, but especially because when annealing-boxes become warped they cannot be made tight at the joints and become entirely useless.

I claim—

1. In an open-bottomed U-shaped annealing-box, the combination of the vertical side walls, a separate top therefor constructed of a single piece of metal bent, shaped, or formed to an arc of a circle as to its longitudinal axis, means for uniting the top section with the side walls, and end heads united to said top and side walls by angle-irons riveted thereto, as described, and for the purposes set forth.

2. In an open-bottomed U-shaped annealing-box, the combination of the vertical side walls, a separate top therefor constructed of a single piece of metal bent, shaped, or formed to an arc of a circle as to its longitudinal axis, said top butt-jointed to the respective side walls, and end heads united to said top and side walls by angle-irons riveted thereto, as described, and for the purposes set forth.

3. In an open-bottomed U-shaped annealing-box, the combination of the vertical side walls, a separate top therefor constructed of a single piece of metal bent, shaped, or formed to an arc of a circle as to its longitudinal axis, said top butt-jointed to the respective side walls, and end heads respectively united to said top and side walls by a single angle-iron bent or shaped to conform to the arch of the box and side walls, and connecting-rivets, as described, and for the purposes set forth.

4. In an open-bottomed U-shaped annealing-box, the combination of the vertical side walls, a separate top therefor constructed of a single piece of metal bent, shaped, or formed to an arc of a circle as to its longitudinal axis, said top butt-jointed to the respective side walls, end heads united to said top and side walls by angle-irons riveted thereto, and a series of strengthening or brace rods or irons riveted, respectively, to said side walls, arched top, and end heads, as described, and for the purposes set forth.

In testimony whereof I have hereunto signed my name this 7th day of July, A. D. 1891.

MILLARD F. WILFONG.

In presence of—
JOHN JOLLEY, Jr.,
CHAS. BUSH.